(12) United States Patent
Hashimoto et al.

(10) Patent No.: US 6,294,266 B1
(45) Date of Patent: *Sep. 25, 2001

(54) LAMINATES

(75) Inventors: Yoshinori Hashimoto; Takashi Yamashita, both of Mie (JP)

(73) Assignee: Japan Polychem Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,633

(22) Filed: Apr. 8, 1998

(30) Foreign Application Priority Data

| Apr. 8, 1997 | (JP) | ................................................ 9-104040 |
| Sep. 11, 1997 | (JP) | ................................................ 9-262909 |
| Feb. 13, 1998 | (JP) | ................................................ 10-046359 |

(51) Int. Cl.[7] ............................................................ B32B 27/00
(52) U.S. Cl. ........................ 428/515; 428/516; 428/461; 428/511; 525/240
(58) Field of Search ................................... 428/515, 516, 428/461, 511; 525/240

(56) References Cited

U.S. PATENT DOCUMENTS

| 4,801,486 | * | 1/1989 | Quacquarella . |
| 4,871,613 | * | 10/1989 | Akao . |
| 4,983,435 | * | 1/1991 | Ueki et al. . |
| 5,206,075 | * | 4/1993 | Hodgson, Jr. . |
| 5,401,537 | * | 3/1995 | Kochem et al. . |
| 5,679,422 | * | 10/1997 | Lind et al. . |
| 5,792,534 | * | 8/1998 | DeGroot et al. . |
| 5,804,020 | * | 9/1998 | Akao et al. . |
| 6,027,776 | * | 2/2000 | Mueller . |

* cited by examiner

*Primary Examiner*—Blaine Copenheaver
*Assistant Examiner*—Jason Savage
(74) *Attorney, Agent, or Firm*—Oblon, Spivak, McClelland, Maier & Neustadt, P.C.

(57) ABSTRACT

In laminates prepared by laminating a base material and sandwich base material via a bonding layer, the adhesion strength between the sandwich base material and bonding layer is not less than 200 g/15 mm wide at 23 ° C. and the bonding layer is formed of a resin composition which comprises an ethylene/ α-olefin copolymer resin, thus to provide useful laminates which are very excellent in adhesion properties to metal foil, deposited metal surfaces of metal-deposited films, and surfaces of other sandwich base materials and in tear properties such as unsealing properties, and have low smell and high strength as packaging films.

9 Claims, No Drawings

LAMINATES

FIELD OF THE INVENTION

The present invention relates to useful laminates which are particularly excellent in adhesive properties to metallic foil such as aluminum foil, deposited metal surfaces of metal-deposited films and surfaces of other sandwich base materials and in tear properties such an unsealing properties and have low small and high strength as packaging films.

BACKGROUND OF THE INVENTION

Laminates which are prepared by sandwich extrusion laminating of a base material such as various re s in film undergoing anchor coat treatment or cellophane and metallic foil or a metal-deposited resin film with a low-density polyethylene resin followed again by extrusion laminating the low-density polyethylene resin have been used as packaging films for various purposes.

About the extrusion laminating as a method of laminating which makes it possible to attain the degree to which the adhesive strength between a bonding layer and metal foil in a laminate meets practical purposes, there is a report (*Convertech*(8), page 36, 1991) on a method for producing laminates, in which an extrusion resin temperature of a low-density polyethylene having good workability is set, for example, at a temperature as high as 320° C. or above to oxidize the resin surface within the air gap between the die and pressure roller and the bonding layer as thin as 10 to 15 μm in coat thickness is allowed to adhere to metal foil's surface. However, the adhesion strength is as weak as 50 to 100 g/15 mm wide and the polyethylene elongates on unsealing of a package, being difficult to tear, because of the weak adhesion to metal. In addition, packaging of viscous, aqueous and heavy articles which requires high pressure resistance to packaging films is quite impossible.

Anchor coat treatment on metallic foil's surfaces may be considered as a means of improving the adhesion strength. However, the anchor coat treatment and extrusion laminating of a single sheet of metal foil as thin as 7 to 12 μm cause tears or creases in the sheet, which makes practical work impossible. JP-A-4-368845 (The term "JP-A" as used herein means an "unexamined published Japanese patent application") reports a method of extrusion laminating of a resin containing polar groups such as an ethylene/acrylic acid copolymer resin and a method of extrusion laminating of an ethylene copolymer resin undergoing ozone treatment which is prepared by copolymerization of ethylene, an unsaturated polybasic acid and an unsaturated monomer selected from lower alkyl esters and vinyl esters of acrylic acid. However, these copolymer resins are unpreferred because of high manufacturing cost, complicated exchange of resins in an extruder and, in addition, smell of the films. When a customary CPP film or a film in which a thin film of silicon oxide is formed at least on one side of a transparent base material is sandwich laminated, the surface of the CPP film or one side of the film having a thin silicon oxide film formed undergoes anchor coat treatment prior to the laminating. In these cases, the films are unpreferred because of high manufacturing cost and smell thereof.

In these situations, a costly method using an adhesive, called "dry laminating," has been unavoidably adopted when strength is required as in packaging bags.

SUMMARY OF THE INVENTION

The present invention is to provide laminates excellent in adhesion strength, in which metal-deposited films or metal foil used as sandwich base materials need not undergo anchor coat treatment on the respective deposited surfaces or surface of the foil, and resin compositions comprising an ethylene/β-olefin copolymer resin with low smell which also is a good purging material are used for a bonding layer; and the resin compositions.

The present invention is characterized by the laminates in which the laminates are formed by laminating at least a base material and s sandwich base material via a bonding layer, the adhesion strength between the sandwich base material and the bonding layer is 200 g/15 mm wide or more (at 23° C.), and in addition, the bonding layer is formed of the resin compositions comprising the ethylene/β-olefin copolymer resin.

DETAILED DESCRIPTION OF THE INVENTION

In the present invention, it is important for the resin compositions forming the bonding layer to have the following physical properties.

1. MPR

The resin compositions for the bonding layer may be from 1 to 100 g/10 minutes, and preferably from 3 to 50 g/10 minutes in MFR (melt flow rate) as defined by JIS-K7210. When the MFR falls to reach the specified range, the adhesion strength to metal foil's surfaces, the deposited metal surfaces of metal-deposited films, or other sandwich base materials (Hereinafter merely referred to as the "adhesion strength to sandwich base materials") is insufficient, and the resins lose ductility and malleability. The MFR exceeding the range results in increasing neck-in. In either case, uniform fused films can not be obtained.

2. Density

The resin compositions for use in the bonding layer may be 0.912 g/cm$^3$ or less, and preferably 0.900 g/cm$^3$ or less in density an defined by JIS-K7112. The lower limit of the density of the resin composition is preferably 0.87 g/cm$^3$. The density exceeding the specified range results in reducing the adhesion strength to sandwich base materials, failing to form laminates having high heat-sealing strength and high pressure resistance required for use as packaging films.

In the present invention, the ethylene/α-olefin copolymer resins used as an indispensable component to the resin compositions are prepared by copolymerization of ethylene with α-olefin, and preferably α-olefin having 3 to 10 carbon atoms such an propylene, butene-1, hexene-1, octene-1, and 4-methylpentene-1. The α-olefin can be used alone or as mixtures of 2 or more kinds thereof. It is important for the copolymer resins to have the following physical properties.

1 MFR

The ethylene/ α-olefin copolymer resins as used herein may be from 1 to 100 g /10 minutes, and preferably from 3 to 50 g/10 minutes in MFR as defined by JIS-K7210. The MFR not reaching the specified range results in lowering the adhesion strength to sandwich base materials and causes the copolymer resins to lose ductility and malleability. On the other hand, the MFR exceeding the specified range results in increasing the neck-in. In either case, uniform fused films can not be obtained.

2 Density.

The ethylene/α-olefin copolymer resins as used herein may be 0.900 g/cm$^3$ or less, and preferably 0.890 g/cm$^3$ or less in density as defined by JIS-K-7112. The lower limit of the density of the ethylene/α-olefin copolymer is preferably 0.86 g /cm$^3$. The density exceeding the specified range results in lowering the adhesion strength to the sandwich base materials, failing to form laminates exhibiting high heat-sealing strength and high pressure resistance required for use as packaging films.

The ethylene/α-olefin copolymer resins as used in the present invention include both of those prepared in the presence of metallocene catalysts (hereinafter referred to as "metallocene materials") and those prepared in the presence of vanadium catalysts (hereinafter referred to an "vanadium materials"). However, the metallocene materials are preferred.

The metallocene materials are prepared according to procedures as described in JP-A-58-19309, JP-A-59-95292, JP-A-60-35005, JP-A-60-35006, JP-A-60-35007, JP-A-60-35008, JP-A-60-35009, JP-A-61-130314, JP-A-3-163008, European Patent Publication No. 420,436, U.S. Pat. No. 5,055,438, and PCT International Publication No. WO91/04275. That is, the metallocene materials are prepared by copolymerization of ethylene as a main component with α-olefin having 3 to 10 carbon atoms as a sub-component in the presence of a metallocene catalyst, a metallocene/alumoxane catalyst, or a catalyst comprising a metallocene compound and a compound forming a stable ion by reaction with the metallocene catalyst as disclosed in PCT International Publication No. WO92/07123.

The vanadium materials are prepared by copolymerization of ethylene as a main component with α-olefin having 3 to 10 carbon atoms as a sub-component in the presence of a catalyst comprising a vanadium compound, an organoaluminous compound and an additional third component in some cases according to the procedure as described in JP-A-52-39741.

In the present invention, it is preferred that the copolymer resins comprising ethylene and α-olefin with 3 to 10 carbon atoms are blended with customary low-density polyethylene for extrusion laminating in order to improve extrusion laminating workability or with other resins to improve the characteristics, such as high-density polyethylene, straight-chained low-density ethylene copolymers, or ethylene/vinyl acetate copolymers, to form resin compositions. The physical properties of preferred low-density polyethylene are shown below.

1 MFR

The low-density polyethylene as used herein may be from 1 to 50 g/10 minutes, and preferably from 3 to 10 g/10 minutes in MFR as defined by JIS-K7210. The MFR not reaching the specified range causes the resins to lose ductility and malleability, whereas the MFR exceeding the specified range results in increasing the neck-in. In either case, uniform fused films can not be produced.

2 Density

The low-density polyethylene as used herein may be from 0.918 to 0.925 g/cm$^3$ in density as defined by JIS-K7112. The density exceeding the specified range results in lowering the adhesion strength to the sandwich base materials, failing to produce laminates having high heat-sealing strength and high pressure resistance required for use as packaging films.

About the components forming the resin compositions, the weight ratio of the ethylene/α-olefin copolymer resin to the low-density polyethylene falls in the range of from 100:0 to 20:80, preferably from 90:10 to 30:70, and more preferably from 80:20 to 40:60. Too a large amount of the low-density polyethylene used as a second component results in lowering the adhesion strength to the sandwich base materials which characterizes the present invention, whereas too a small amount thereof results in increasing the neck-in in the extrusion laminating work, failing to produce uniform fused films.

In the present invention, various, arbitrary additives can be added to the resin compositions. Examples of the additives include antioxidants, slip agents such as higher fatty amides, antistatic agents such as polyglycerin fatty acid, anti-fog additives, neutralizing agents such as zinc stearate and calcium stearate, anti-blocking agents such as silicon oxide and calcium sulfate, organic and inorganic pigments such as titanium oxide, ferric oxide and carbon, and flame retardants. These additives and fillers can be added as needed. Addition of substances which extremely lower the adhesion strength or deteriorate volume or smell, or addition of a large amount thereof should be avoided.

The bonding layers used in the present invention are formed and shaped by melt extrusion of the copolymer resin compositions. The forming temperature is from 150 to 320° C. The temperature of 150° C. or below causes the adhesion to the sandwich base materials to deteriorate, whereas exceeding 320° C. is undesirable in view of the adhesive properties, workability, and smell. In the laminating via the bonding layer, it is desirable that, as pretreatment, ozone treatment is carried out between the bonding layer extruded and sandwich base material and between the bonding layer extruded and base material usually at 190 to 320° C. and preferably at 190 to 300° C. in view of the adhesion to the sandwich base materials and smell.

The ozone treatment is achieved within the air gap by blowing a gas (air) containing ozone from a nozzle or slit outlet toward the bonding layer's surface, sandwich base material's surface, or base material's surface to be laminated with the layer or toward a contact bonding area of the both. When the extrusion laminating is carried out at a speed of 100 m/minute or more, it is preferred to blow the gas toward the contact bonding area of the both. The concentration of ozone in the gas is preferably 1 g/m$^3$ or more, and more preferably 3 g/m$^3$ or more. The blowing amount to the width of the bonding layer is preferably 0.03 liter/minute/cm and more preferably 0.1 liter/minute/cm or more.

The thickness of the bonding layer, that is, the extrusion coat thickness in general is from 10 to 20 μm and the laminating speed in general is from 100 to 150 m/minute in view of productivity. The air gap of known extrusion laminators is usually from 100 to 150 mm.

Examples of the base materials used in the present invention include films, sheets and woven or unwoven fabrics of synthetic resins such as polyolefin, saponified ethylene/vinyl acetate copolymers, polyesters, polyamides, polyvinyl alcohol, polyvinyl chloride, and polyvinylidene chloride; paper; and cellophane. The surfaces thereof may undergo corona discharge treatment, flame treatment, anchor coat treatment, or ozone treatment, as needed.

The sandwich base materials used in combination with the base materials described above can be selected from various laminates depending on the objective. The base materials can also serve as the sandwich base materials. Metal foil, metal-deposited films and ceramic-deposited films may be used for the purpose of gas impermeability, polypropylene films for the purpose of oil resistance, polystyrene films for the purpose of easy unsealing of packages, and paper for the purpose of high rigidity.

Although the kinds of metal foil are not particularly limited, the metal foil used generally is aluminum foil, tin foil, lead foil, zinc-plated steel foil, ionized metal thinned by electrolysis, and iron foil, which preferably have a thickness of 5 to 50 μm. Although metal deposited films also are not particularly limited, the deposited metals used preferably are aluminum and zinc, and the thickness thereof is preferably from 0.01 to 0.2 μm. Methods of deposition also are not particularly limited, and known methods such as vacuum metallizing, ion plating, or spattering are applied. About ceramic-deposited films, the deposited ceramics include in addition to silicon oxide represented by general formula $SiO_x$ ($0.5 \leq x \leq 2$), glass, metal oxides such as alumina and tin oxides, and metal fluorides such as fluorite and selenium fluoride. Metal oxides can contain a trace amount of metal, other metal oxides, or metal hydroxides. The deposition can also be achieved by applying the various methods described above at least to one side of a film. The thickness of the deposited films is usually from about 12 to about 40 μm. The films to be deposited are not particularly limited and examples thereof include oriented or non-oriented polyester films, polypropylene films and polyamide films.

The polypropylene films and polystyrene films used are not particularly limited and either oriented or non-oriented ones can be used. These films include, for examples, non-oriented polypropylene films (CPP films), oriented polypropylene films (OPP films), and oriented polystyrene sheets (OPS). Polymers forming these films can be homopolymers, copolymers comprising propylene or styrene as main components, or rubber-like polymers such as styrene-butadiene rubber (SBR).

These sandwich base materials, particularly the metal foil or metal-deposited films, after laminating their metal surfaces and the base materials with the bonding layers of the present invention, can further be subjected to extrusion laminating, if necessary, on the opposite sides undergoing no laminating, that is, on resin sides of the deposited films or the other metal sides thereof. Then, in some cases, it is very effective in adhesion that an anchor coat layer is formed, hot-air drying is performed, and the drying temperature or, if post-heating is performed, the post-heating temperature is adjusted to about 80 to about 140° C. The heating time is usually from 0.5 to 10 seconds, and preferably from 0.5 to 5 seconds. Too short time results in insufficient improvement in the adhesion strength whereas too long time is disadvantageous in productivity.

EXAMPLES

Experimental examples consisting of Examples and Comparative Examples are described below to illustrate the present invention in more detail.

In the Examples and Comparative Examples, the measurement of physical properties of the resins and the evaluation of the physical properties of the laminates were achieved by the following methods. Results are shown in Tables 1 and 2.

1. Measurement of Physical Properties of Resins
(A) MFR: Based on JIS-K7210 (190° C., 2.16 kg load)
(B) Density: Based on JIS-K7112
(C) Oxygen Permeability: Based on JIS-Z1707 (20° C., 80% RH)
2. Evaluation of Physical Properties of Laminates
(A) Adhesion Strength: Test specimens of 15 mm in wide× 100 mm in length in size were cut from the laminates along the forming flow direction. An ethylene/α-olefin copolymer resin layer forming the bonding layer of the specimens in part was forcibly stripped off from a sandwich base material layer such as metal foil, conditioned at 23° C. and 50% RH, and underwent 180° stripping at a pulling rate of 300 mm/minute to determine the adhesion strength. In the scope of these experimental examples, it is considered that the adhesion strength is preferably from about 400 to about 1000 g/15 mm wide.
(B) Tear Properties: Test specimens of 10 cm×10 cm in size were cut off from the laminates. A cut of 1 cm in length from the edge was produced with a knife in the middle portion of one side of the specimen to tear off the specimen from the portion. The tear properties were evaluated in the following three grades.
  ○ Good
  Δ Torn with a little resistance
  x Tearing is interrupted by considerable resistance

Example 1

A biaxially oriented polyester film base material of 12-μm thickness is coated with a solution of a polybutadiene anchor coat agent (manufactured by Nippon Soda Co., Ltd., Titabond T-180), and dried at 80° C. for 3 seconds. A mixture of (a) 80 wt % of an ethylene/butene-1 copolymer resin (metallocene material: MFR 32 g/10 minutes, density 0.88 g/cm$^3$, butene content 23 wt %) and 20 wt % of low-density polyethylene LC600A (manufactured by Nippon Polychem.: MFR 7 g/10 minutes, Density 0.919 g/cm$^3$) was extruded from a T-die mounted on an extruder having a bore diameter of 90 mm at a resin temperature of 290° C. in 550 mm in width between the dried surface of the anchor coat layer described above and aluminum foil of 7-μm thickness to sandwich laminate. Then, the air gap was set to 120 mm, the speed of laminate to 100 m/minute, and the thickness of the laminate layer to 15 μm. The ozone treatment was performed between the base material and resin and between the resin and aluminum foil, respectively.

Furthermore, the aluminum foil's surface undergoing no laminating was similarly coated with the solution of the polybutadiene anchor coat agent and dried again at 80° C. for 3 seconds, and subsequently the anchor coat layer formed underwent extrusion-laminating with Low-Density Polyethylene LC600A at a resin temperature of 320° C. and a speed of 100 m/minute in a thickness of 20 μm, thus to prepare a laminate.

Comparative Example 1

Laminates were obtained in a manner similar to Example 1, except that the sandwich laminating resins were changed from the mixture to a single Low-Density Polyethylene LC600A and the resin temperature was changed from 290° C. to 320° C.

Comparative Example 2

Laminates were obtained in a manner similar to Example 1, except that the copolymer resin of the sandwich laminating resins was changed from the ethylene/butene-1 copolymer resin to an ethylene/hexene-1 copolymer resin (metallocene material: MFR 4 g/10 minute, density 0.912 g/cm$^3$ hexene content 13 wt %).

Examples 2 and 3

Laminates were prepared in a manner similar to Example 1, except that the composition of the sandwich laminating resins was changed as described in Table 1.

Example 4

Laminates were prepared in a manner similar to Example 1, except that the copolymer resin of the sandwich laminating resins was changed from the ethylene/butene-1 copolymer resin to an ethylene/hexene-1 copolymer resin (metallocene material: MFR 16 g/10 minutes, density 0.895 g/cm$^3$, hexene content 18 wt %).

Example 5

Laminates were prepared in a manner similar to Example 1, except that the copolymer resin of the sandwich laminating resins was replaced by an ethylene/butene-1 copolymer resin (vanadium material, "A20090" manufactured by Mitsui Petrochemical Co., Ltd.: MFR 18 g/10 minute, density 0.89 g/cm$^3$, butene content 20 wt %).

Example 6

Laminates were prepared in a manner similar to Example 1, except that the resin temperature was changed from 290° C. to 320° C.

Example 7

Laminates were prepared in a manner similar to Example 1, except that the sandwich base material was changed from aluminum foil to a CPP film (manufactured by Nimura Chemical Industries: sort: FHK 2) and merely sandwich laminating was performed.

Comparative Example 3

Laminates were prepared in a manner similar to Example 7, except that the sandwich laminating resins were changed from the mixture to single Low-Density Polyethylene LC600A and the resin temperature was changed from 290° C. to 320° C.

Example 8

Laminates were prepared in a manner similar to Example 7, except that the sandwich base material was changed from the CPP film to an SBR film of 30-$\mu$m thickness (manufactured by Okura Industrial Co., Ltd.: sort: GH2).

Comparative Example 4

Laminates were prepared in a manner similar to Example 8, except that the sandwich laminating resins were changed from the mixture to the single low-density polyethylene LC600A and the resin temperature was changed from 290° C. to 320° C.

Example 9

Laminates were prepared in a manner similar to Example 1, except that the sandwich base material was changed from aluminum foil to a glass-deposited polyester film of 12-$\mu$m thickness (manufactured by Mitsubishi Chemical Corp.: trade name: Techbarrier E) and glass-deposited surface underwent the sandwich laminating.

Comparative Example 5

Laminates were prepared in a manner similar to Example 9, except that the sandwich laminating resins were changed from the mixture to the single low-density polyethylene LC600A and the resin temperature was changed from 290° C. to 320° C.

TABLE 1

Laminates (Base Material = OPET, Sandwich Base Material = Aluminum foil)

|  | Example 1 | Comp. Example 1 | Comp. Example 2 | Example 2 | Example 3 | Example 4 | Example 5 | Example 6 |
|---|---|---|---|---|---|---|---|---|
| Bonding Layer = Resin Composition (A + B) | | | | | | | | |
| MFR | 24 | 7 | 3*5 | 35 | 15 | 12 | 14 | 24 |
| Density | 0.888 | 0.919 | 0.913 | 0.880 | 0.903 | 0.900 | 0.896 | 0.888 |
| A: Ethylene/α-Olefin Copolymer | | | | | | | | |
| <Butene-1> | | | | | | | | |
| MFR = 35, Density = 0.88 | 80% | | | 100% | 40% | | | 80% |
| MFR = 18, Density = 0.89 | | | | | | | 80% | |
| <Hexene-1> | | | | | | | | |
| MFR = 4, Density = 0.912 | | | 80% | | | | | |
| MFR = 16, Density = 0.895 | | | | | | 80% | | |
| B: Low-Density PE | | | | | | | | |
| MFR = 7, Density = 0.919 | 20% | 100% | 20% | | 60% | 20% | 20% | 20% |
| Resin Temperature (° C.) | 290 | 320 | 290 | 290 | 290 | 290 | 290 | 320 |
| Physical Properties | | | | | | | | |
| Adhesion Strength | | | | | | | | |
| (g/15 mm) | 730 | 50 | 60 | 1050 | 510 | 280 | 320 | 460 |
| Tear Properties | ○ | X | X | ○*) | ○ | Δ | Δ | ○ |

* Surge was slightly generated.

TABLE 2

Laminates (Base Material = OPET)

|  | Example 7 | Comp. Example 3 | Example 8 | Comp. Example 4 | Example 9 | Comp. Example 5 |
|---|---|---|---|---|---|---|
| Sandwich Base Material | CPP Film | | SBR Film | | Glass-Deposited Film | |
| Bonding Layer = Resin Composition (A + B) | | | | | | |
| MFR | 24 | 7 | 24 | 7 | 24 | 7 |
| Density | 0.888 | 0.919 | 0.888 | 0.919 | 0.888 | 0.919 |

TABLE 2-continued

| | Laminates (Base Material = OPET) | | | | | |
|---|---|---|---|---|---|---|
| | Example 7 | Comp. Example 3 | Example 8 | Comp. Example 4 | Example 9 | Comp. Example 5 |
| A: Ethylene/α-Olefin Copolymer <Butene-1> | | | | | | |
| MFR = 35, Density = 0.88 | 80% | | 80% | | 80% | |
| B: Low-Density PE | | | | | | |
| MFR = 7, Density = 0.919 | 20% | 100% | 20% | 100% | 20% | 100% |
| Resin Temperature (° C.) | 290 | 320 | 290 | 320 | 290 | 320 |
| Physical Properties | | | | | | |
| Adhesion Strength (g/15 mm) | 750 | 50 | 1000 | 50 | 550 | 10 |
| Tear Properties | ○ | X | ○ | X | ○ | X |
| Oxygen Permeability (cc/24 hr.atm) | | | | | 1.0 | 2.5 |

In the laminates of the present invention, a base material and sandwich base material are laminated via a bonding layer and the adhesion strength between the sandwich base material and bonding layer is 200 g/15 mm wide or more at 23° C., and in addition, use of a resin composition comprising an ethylene/α-olefin copolymer resin as the bonding layer permits a great improvement in adhesion between the sandwich base material and bonding layer, and produces excellent unsealing properties and higher pressure resistance on forming bags than in products by the dry laminating.

What is claimed is:

1. A laminate in which a base material and a sandwich base material selected from the group consisting of metal foils, metal-deposited films, ceramic-deposited films, polystyrene films, and paper, are laminated via a bonding layer, wherein the adhesion strength between the sandwich base material and the bonding layer is not less than 200 g/15 mm wide at 23° C., and the bonding layer is formed of a resin composition comprising an ethylene/α-olefin copolymer resin having an MFR of from 1 to 100 g/10 minutes and a density of 0.912 g/cm$^3$ or less.

2. A laminate as claimed in claim 1, wherein the bonding layer comprises a copolymer resin which comprises (i) an ethylene/ α-olefin copolymer resin of ethylene and an α-olefin having 3 to 10 carbon atoms, the ethylene/α-olefin copolymer resin having an MFR of from 1 to 100 g/10 minutes and a density of 0.900 g/cm$^3$ or less, and (ii) a low-density polyethylene having an MFR of from 1 to 50 g/10 minutes and a density of 0.918 to 0.925 g/cm$^3$, and wherein the weight ratio of the ethylene/ α-olefin copolymer resin to the low-density polyethylene is from 100:0 to 20:80.

3. A laminate as claimed in claim 2, wherein the weight ration of the ethylene/α-olefin copolymer resin to the low-density polyethylene is from 90:10 to 30:70.

4. A laminate as claimed in claim 2, wherein the ethylene/α-olefin copolymer resin is prepared in the presence of a metallocene catalyst and has a density of 0.890 g/cm$^3$ or less.

5. A laminate as claimed in claim 1, wherein the sandwich base material is a metal foil.

6. A laminate as claimed in claim 1, wherein the sandwich base material is a metal-deposited film.

7. A laminate as claimed in claim 1, wherein the sandwich base material is a ceramic-deposited film.

8. A laminate as claimed in claim 1, wherein the sandwich base material is a polystyrene film.

9. A laminate as claimed in claim 1, wherein the sandwich base material is paper.

* * * * *